United States Patent
Touge

(10) Patent No.: US 7,528,703 B2
(45) Date of Patent: May 5, 2009

(54) OBSTACLE DETECTING SYSTEM FOR VEHICLE

(75) Inventor: Hiroshi Touge, Ichinomiya (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 282 days.

(21) Appl. No.: 11/491,942

(22) Filed: Jul. 25, 2006

(65) Prior Publication Data
US 2007/0024431 A1 Feb. 1, 2007

(30) Foreign Application Priority Data
Jul. 26, 2005 (JP) ............................. 2005-216169

(51) Int. Cl.
*B60Q 1/00* (2006.01)
(52) U.S. Cl. .................................... 340/435; 340/425.5
(58) Field of Classification Search .................. 340/435
See application file for complete search history.

(56) References Cited

U.S. PATENT DOCUMENTS

| | | | |
|---|---|---|---|
| 4,600,913 A * | 7/1986 | Caine | 340/435 |
| 6,114,950 A * | 9/2000 | Schaible et al. | 340/435 |
| 2002/0047780 A1* | 4/2002 | Nishimoto et al. | 340/540 |
| 2002/0171739 A1* | 11/2002 | Yamada | 348/148 |
| 2004/0201463 A1* | 10/2004 | Ko | 340/435 |
| 2005/0253693 A1* | 11/2005 | Rennick et al. | 340/435 |

FOREIGN PATENT DOCUMENTS

| JP | 2001-208843 A | 8/2001 |
|---|---|---|
| JP | 2004-230993 A | 8/2004 |

* cited by examiner

*Primary Examiner*—Toan N Pham
*Assistant Examiner*—Kerri L McNally
(74) *Attorney, Agent, or Firm*—Sughrue Mion, PLLC

(57) ABSTRACT

An obstacle detecting system for a vehicle, which includes an ultrasonic sensor provided at a vehicle body for detecting obstacles surrounding the vehicle. A central axis in a transmitting direction of an ultrasonic wave from the ultrasonic sensor is arranged to approximately follow a surface of the vehicle body.

12 Claims, 15 Drawing Sheets

FIG. 18A

| 200a | Timer counter value at vertex | Voltage counter value at vertex | Rise estimated value |
|---|---|---|---|
| Candidate 1 | 6122 | 31648(P1) | 5587(T1) |
| Candidate 2 | 7570 | 13328(P2) | 7071(T2) |
| Candidate 3 | 8832 | 11920(P3) | 8433(T3) |
| Candidate 4 | 11713 | 15808(P4) | 11324(T4) |

FIG. 18B

| 200b | Timer counter value at vertex | Voltage counter value at vertex | Rise estimated value |
|---|---|---|---|
| Candidate 1 | 6251 | 28592(P1) | 5685(T1) |
| Candidate 2 | 7656 | 6688(P2) | 7461(T2) |
| Candidate 3 | 8875 | 11184(P3) | 8495(T3) |
| Candidate 4 | 11756 | 14592(P4) | 11317(T4) |

FIG. 18C

| 200c | Timer counter value at vertex | Voltage counter value at vertex | Rise estimated value |
|---|---|---|---|
| Candidate 1 | 6423 | 34016(P1) | 5744(T1) |
| Candidate 2 | 7785 | 10000(P2) | 7460(T2) |
| Candidate 3 | 8746 | 10528(P3) | 8422(T3) |
| Candidate 4 | 11670 | 13858(P4) | 11266(T4) |

FIG. 19A

|  | Candidate table 200a | Candidate table 200b |
|---|---|---|
| Combination 1 | Candidate value 1 (Rise estimated value 5587) | Candidate value 1 (Rise estimated value 5685) |
| Combination 2 | Candidate value 3 (Rise estimated value 8433) | Candidate value 3 (Rise estimated value 8495) |
| Combination 3 | Candidate value 4 (Rise estimated value 11324) | Candidate value 4 (Rise estimated value 11317) |

FIG. 19B

|  | Candidate table 200b | Candidate table 200c |
|---|---|---|
| Combination 1 | Candidate value 1 (Rise estimated value 5685) | Candidate value 1 (Rise estimated value 5744) |
| Combination 2 | Candidate value 2 (Rise estimated value 7461) | Candidate value 2 (Rise estimated value 7460) |
| Combination 3 | Candidate value 3 (Rise estimated value 8495) | Candidate value 3 (Rise estimated value 8422) |
| Combination 4 | Candidate value 4 (Rise estimated value 11317) | Candidate value 4 (Rise estimated value 11266) |

FIG. 19C

|  | Candidate table 200c | Candidate table 200a |
|---|---|---|
| Combination 1 | Candidate value 1 (Rise estimated value 5744) | Candidate value 1 (Rise estimated value 5587) |
| Combination 2 | Candidate value 3 (Rise estimated value 8422) | Candidate value 3 (Rise estimated value 8433) |
| Combination 3 | Candidate value 4 (Rise estimated value 11266) | Candidate value 4 (Rise estimated value 11324) |

FIG. 20

|  | Candidate table 200a | Candidate table 200b | Candidate table 200c |
|---|---|---|---|
| Combination 1 | Candidate value 1 (Rise estimated value 5587) | Candidate value 1 (Rise estimated value 5685) | Candidate value 1 (Rise estimated value 5744) |
| Combination 2 | Candidate value 3 (Rise estimated value 8433) | Candidate value 3 (Rise estimated value 8495) | Candidate value 3 (Rise estimated value 8422) |
| Combination 3 | Candidate value 4 (Rise estimated value 11324) | Candidate value 4 (Rise estimated value 11317) | Candidate value 4 (Rise estimated value 11266) |

|  | x | y | z |
|---|---|---|---|
| Obstacle 1 | 32.3 | 29.5 | 31.2 |
| Obstacle 2 | 29.6 | -62.1 | 41.9 |
| Obstacle 3 | -23 | -12 | 103.9 |

OBSTACLE DETECTING SYSTEM FOR VEHICLE

CROSS REFERENCE TO RELATED APPLICATIONS

This application is based on and claims priority under 35 U.S.C. §119 with respect to Japanese Patent Application No. 2005-216169 filed on Jul. 26, 2005, the entire content of which is incorporated herein by reference.

FIELD OF THE INVENTION

The present invention relates to an obstacle detecting system for a vehicle. More particularly, the present invention pertains to an obstacle detecting system for a vehicle, which includes an ultrasonic sensor mounted on a vehicle body to detect an obstacle in the vicinity of a vehicle.

BACKGROUND

A known obstacle detecting system includes plural ultrasonic sensors horizontally mounted on a bumper of a vehicle. According to this obstacle detecting system, a central axis in a transmitting direction of the ultrasonic sensors is set in a horizontal direction relative to the vehicle, and ultrasonic wave is transmitted normal to a surface (i.e., vertical to a surface) from the ultrasonic sensor mounted on a surface of the vehicle. By measuring time before receiving ultrasonic wave reflected back to the ultrasonic sensor by an obstacle, distance between the ultrasonic sensor and the obstacle is detected, and a driver is being alerted of the existence of that obstacle when the distance is within a predetermined range.

Ultrasonic sensors are classified into an ultrasonic sensor, which transmits ultrasonic wave, and this ultrasonic wave is being reflected back as an echo by a single ultrasonic sensor to detect obstacles, and a pair of ultrasonic sensors which detects obstacles by transmitting the ultrasonic wave by means of one of the sensors and by receiving echo by means of the other of the sensors. A two-dimensionally viewed detectable range of the single ultrasonic sensor, including the ultrasonic sensor, is sectorial. The two-dimensionally viewed detectable range of the pair of ultrasonic sensors including the ultrasonic sensor is elliptical.

With the construction of the known obstacle detecting system for the vehicle, for example disclosed in JP2001-208843A, various detectable ranges of obstacles can be set by combining the single ultrasonic sensor and the pair of ultrasonic sensors.

Notwithstanding, according to the known obstacle detecting system for the vehicle explained above, a central axis of ultrasonic waves in a transmitting direction is determined in a horizontal direction of the vehicle, and ultrasonic waves are transmitted normal to a surface of the vehicle on which the ultrasonic sensor is mounted. The ultrasonic sensor has undetectable ranges in the vicinity of a sensor head, and obstacles are undetectable in those ranges. Thus, there is a drawback that, in case an ultrasonic sensor is mounted on a bumper of a vehicle, when the vehicle nears an obstacle too close to the bumper, the obstacle becomes undetectable because of being in the undetectable range. There is another drawback that an obstacle located in an opening direction of a rear door of a vehicle becomes undetectable when a part of the rear door of the vehicle is off the detectable range of the obstacle by the ultrasonic sensor by the opening of the rear door because the ultrasonic sensor is mounted on the bumper.

A need thus exists for an obstacle detecting system for a vehicle, which improves an obstacle detecting performance in the vicinity of the vehicle.

SUMMARY OF THE INVENTION

In light of the foregoing, the presnet invention provides an obstacle detecting system for a vehicle, which includes an ultrasonic sensor provided at a vehicle body for detecting obstacles surrounding the vehicle. A central axis in a transmitting direction of an ultrasonic wave transmitted from the ultrasonic sensor is arranged to approximately follow a surface of the vehicle body.

According to another aspect of the present invention, an obstacle detecting system for a vehicle, include an ultrasonic sensor fixed on a surface of a vehicle door, which opens and closes, in the vicinity of a hinge. A central axis in a transmitting direction of an ultrasonic wave transmitted from the ultrasonic senor is arranged to have an angle equal to or greater than zero degrees and less than 90 degrees relative to a surface of the vehicle door.

BRIEF DESCRIPTION OF THE DRAWINGS

The foregoing and additional features and characteristics of the present invention will become more apparent from the following detailed description considered with reference to the accompanying drawings, wherein:

FIGS. 18A-18C are examples of candidate tables.

FIGS. 19A-19C are examples of processing for specifying reflected waves by an obstacle.

FIG. 20 is an example of processing for specifying reflected waves by the obstacle.

DETAILED DESCRIPTION

Embodiments of the present invention will be explained with reference to illustrations of drawing figures as follows.

Figure 1:
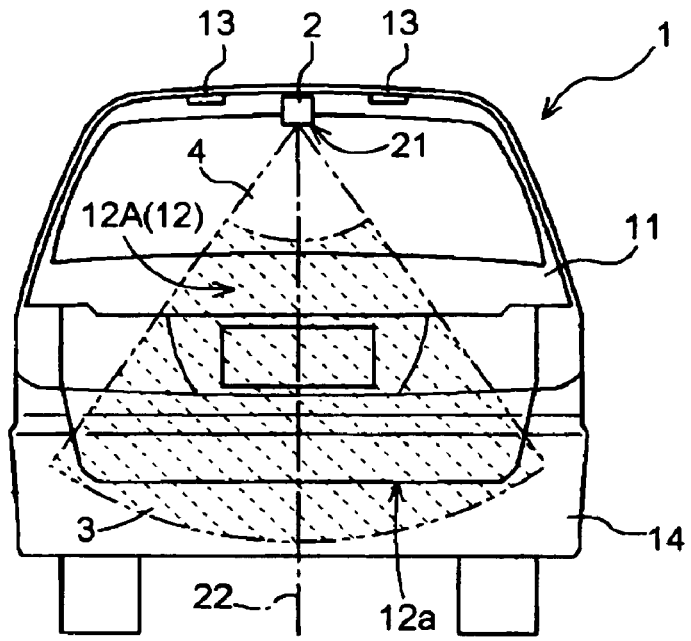
FIG. 1 is a rear view of a vehicle showing a detectable range of an ultrasonic sensor of an obstacle detecting system for a vehicle according to a first embodiment of the present invention.
Figure 2:
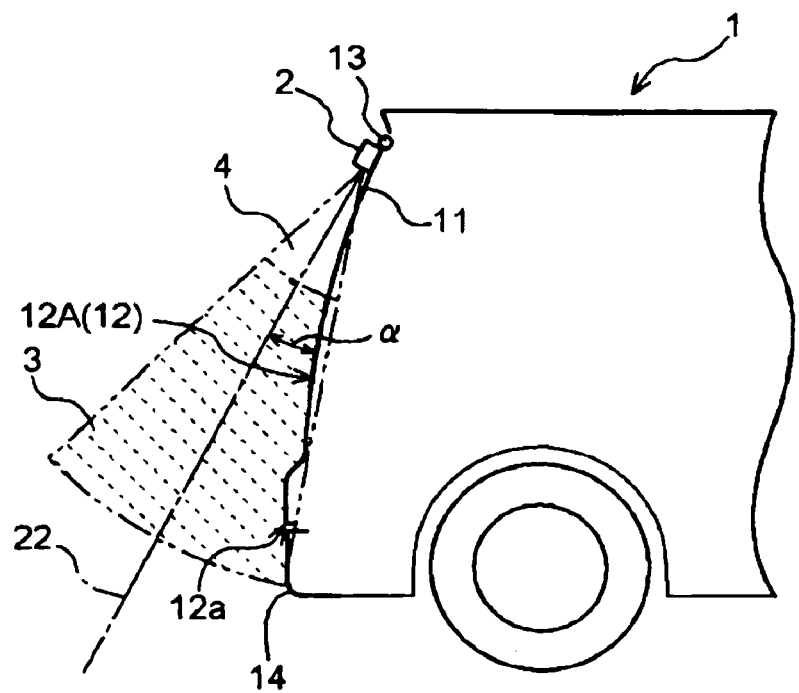
FIG. 2 is a lateral view of the vehicle showing the detectable range corresponding to FIG. 1.

FIG. 1 shows a detectable range when an ultrasonic sensor is mounted on a rear door of a vehicle, and FIG. 2 shows a lateral view of FIG. 1. The rear door corresponds to a hinged door which opens upward. The rear door is operated to open and close relative to the vehicle.

An ultrasonic wave (e.g., pulse) is transmitted from the ultrasonic sensor, reflected wave (i.e., echo) is generated when the ultrasonic wave contacts an obstacle, and the ultrasonic sensor receives the reflected wave. A distance between the ultrasonic sensor and the obstacle is detected on the basis of difference in time between the ultrasonic wave being transmitted and the reflected wave being received. When the distance between the ultrasonic sensor and the obstacle is wit a predetermined range, the existence of the obstacle is informed to a driver by buzzer sounds and by visual warning indication.

As shown in FIG. 1, an ultrasonic sensor 2 is mounted on a rear door 11 of a vehicle in the vicinity of hinges 13. The rear door 11 is operated to open and close relative to the vehicle. A central axis 22 of the ultrasonic sensor 2 in a transmitting direction of an ultrasonic wave is, as shown in FIG. 2, in a slanting direction to the bottom approximately following a surface 12A of the rear door of the vehicle. An angle between the central axis 22 and the surface 12A of the rear door 11 may be within 45 degrees. A detectable range 3 extends in front of the ultrasonic sensor 2. The detectable range 3 is extended in the sector two-dimensionally including the ultrasonic sensor and in a truncated cone three-dimensionally. An undetectable range 4 by the ultrasonic sensor 2 exists in the vicinity of a sensor head 21. By setting the angle (elevation angle α) between the central axis 22 and the surface 12A of the rear door to be equal to or greater than 0 degrees and less than 90 degrees, truncated conical detectable range of the ultrasonic sensor 2 can be set tangent to the surface 12A of the rear door, and a detectable range of an obstacle can be expanded by reducing the undetectable area in the vicinity of the surface. By setting the elevation angle α to be equal to or greater than 0 degrees and less than 60 degrees, an ultrasonic sensor with low output becomes applicable. Further, detection sensitivity further increases by setting the elevation angle α to be equal to or greater than 0 degrees and less than 45 degrees. And, by stopping the open-close operation of the rear door 11 after detecting the obstacle, a contact between the rear door 11 and the obstacle becomes avoidable.

As shown in FIG. 2, unlike the known obstacle detecting system for the vehicle in which the ultrasonic sensor 2 is mounted on the surface of the vehicle, especially the rear door 11 and a central axis of a transmitting direction of the ultrasonic wave is directed to a horizontal direction, according to the embodiment of the present invention, a detectable range 3 of the ultrasonic sensor 2 covers the vicinity of a bumper 14. The surface 12A of the convex rear door 11 exists on a line connecting the ultrasonic sensor 2 and the bumper 14. The ultrasonic wave transmitted from the ultrasonic sensor can diffract along the convex surface 12A of the rear door 11 to reach the bumper 14. Accordingly, generation of the undetectable range in the vicinity of the bumper can be avoided, and an obstacle (object) in the vicinity of the bumper can be detected.

Figure 4:
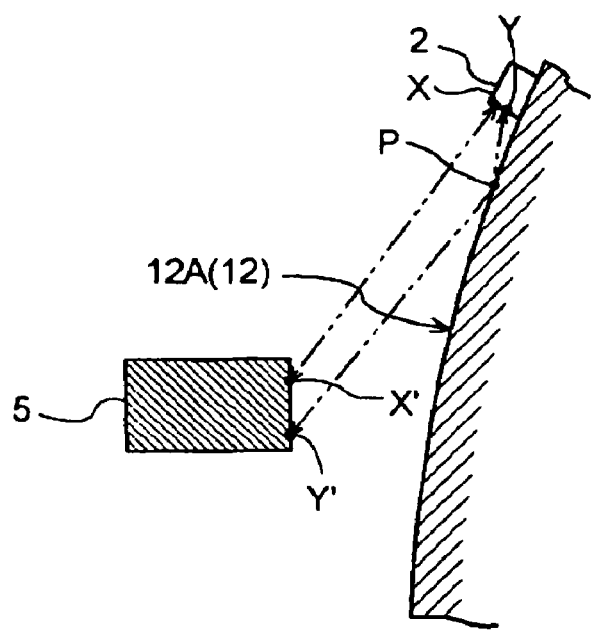
FIG. 4 is a schematic view showing reflection of an ultrasonic wave on a vehicle body.

As shown in FIG. 2, according to the embodiment of the present invention, the detectable range 3 of the ultrasonic sensor 2 covers the surface 12 of the vehicle body and particularly tie surface 12A of the rear door 11. In this case, the ultrasonic wave (echo), which is reflected back on the surface 12 of the vale, can be used for detecting obstacles. That is, as shown in FIG. 4, there are a normal path XX' (i.e., a path for directly reflected waves (i.e., echo)) through which the ultrasonic wave contacts an obstacle 5 directly from the ultrasonic sensor 2, and a path YPY' (i.e., a path for transmitting ultrasonic wave through alternate routing) through which the ultrasonic wave transmitted from the ultrasonic sensor 2 contacts the obstacle 5 after reflecting on a point P on the surface 12 of the vehicle body. Thus, the ultrasonic wave through the path YPY' (i.e., echo returned through alternate routing) can be applied for detecting obstacles. Further, because the ultrasonic wave routed through the path YPY' which is reflected on the surface of the vehicle body is not in parallel to the path XX', an obstacle can be detected more readily compared to by the ultrasonic wave routed through the path XX' even for an obstacle having a configuration which is hard to be detected by the ultrasonic wave routed through the normal path XX', for example, even for an obstacle which has a configuration being positioned approximately in parallel to the path XX'. Accordingly, by covering the surface of the vehicle body as the detectable range, obstacles can be detected effectively.

Figure 3:
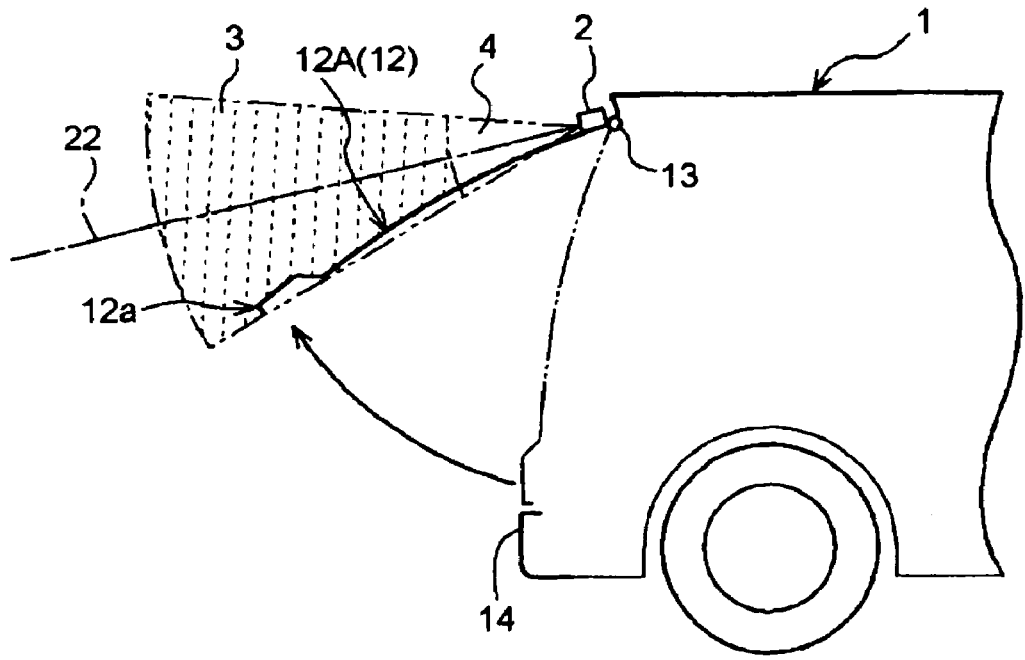
FIG. 3 is a lateral view of the vehicle showing a detectable range when a rear door of the vehicle shown in FIG. 1 is opened.

Further, because the ultrasonic sensor 2 is positioned in the vicinity of the hinge 13 of the rear door 11 of the vehicle, the ultrasonic sensor 2 moves together with the rear door 11 when the rear door 11 opens and closes. Accordingly, as shown in FIG. 3, the central axis 22 in a transmitting direction of the ultrasonic wave from the ultrasonic sensor 2 constantly and approximately follows the surface of the rear door 11, and the detectable range 3 moves together with the rear door 11 at the opening of the rear door 11. Thus, obstacles existing in an opening direction of the rear door 11 can be detected readily.

Further, as shown in FIGS. 1-3, the detectable range 3 of the ultrasonic sensor 2 covers a tip end portion 12a of the surface of the rear door 11. The tip end portion 12a of the surface of the rear door 11 is the outermost exposed part that moves with the rear door 11 when the rear door 11 opens, that is, the tip end portion 12a most likely to contact an obstacle when the rear door 11 opens. Accordingly, by including the tip end portion 12a within the detectable range 3 of the ultrasonic sensor 2, an obstacle can be detected more securely when opening the rear door 11.

When slanting a central axis in a transmitting direction of ultrasonic wave of the ultrasonic sensor, for example, downward, the detectable range may include not only obstacles but also a part of vehicle body such as a bumper, or a curb, a road, or the like. In those cases, with a normal ultrasonic sensor, a part of the vehicle body and a curb, or the like are detected as obstacles, and thus the unnecessary information is transmitted to a driver and the obstacle cannot be detected effectively. Accordingly, by applying an ultrasonic sensor which can detect objective obstacles more accurately by eliminating predetermined response signals (e.g., waveform, response time) in order to distinguish obstacles from objects other than the obstacles, an obstacle detecting system for a vehicle which excels in detecting performance can be obtained.

With the construction of the embodiment of the present invention, as explained above, a part of the vehicle body such as a bumper 14 is included in the detectable range 3 of the ultrasonic sensor 2. Thus, because the reflected wave from the part of the vehicle body such as the bumper 14 is generated, it is required to distinguish the reflected wave from obstacles from the reflected wave from the part of the vehicle body such as the bumper 14 for effective detection of obstacles.

With the ultrasonic sensor 2 according to the embodiment of the present invention, predetermined response signals are eliminated in order to distinguish reflected wave from an objective obstacle from reflected wave from the part of the vehicle body such as the bumper 14. For example, in case of the bumper 14, under a state where the rear door 11 is closed, because distance L from the ultrasonic sensor 2 to the bumper 14 is constant, response time T of the ultrasonic sensor from transmitting the ultrasonic wave to receiving the reflected wave relative to the bumper 14 becomes constant. Accordingly, by eliminating the response signals which return with response time T, bumper 14 and the obstacle can be distinguished. Likewise, under a state where the rear door 11 is closed, because a configuration of the bumper 14 relative to the ultrasonic sensor 2 is constant, reflected wave R from the bumper 14 becomes constant. Thus, by eliminating signals corresponding to the reflected wave R among the response signals, obstacles can be distinguished from the bumper.

The foregoing methods are applicable to other parts of the vehicle other than the bumper. By determining a detectable range within a predetermined distance from a vehicle, for example by eliminating the reflected wave returning in equal to or longer than the predetermined time, objects which are close to the ground such as a curb or a road can be eliminated from the detectable range of the ultrasonic sensor.

As foregoing, in order to distinguish obstacles from objects other than the obstacles, objective obstacles can be detected more accurately by eliminating the response time based on waveforms and a predetermined response time, and an obstacle detecting system for a vehicle which excels in detecting performance can be provided.

Figure 5:
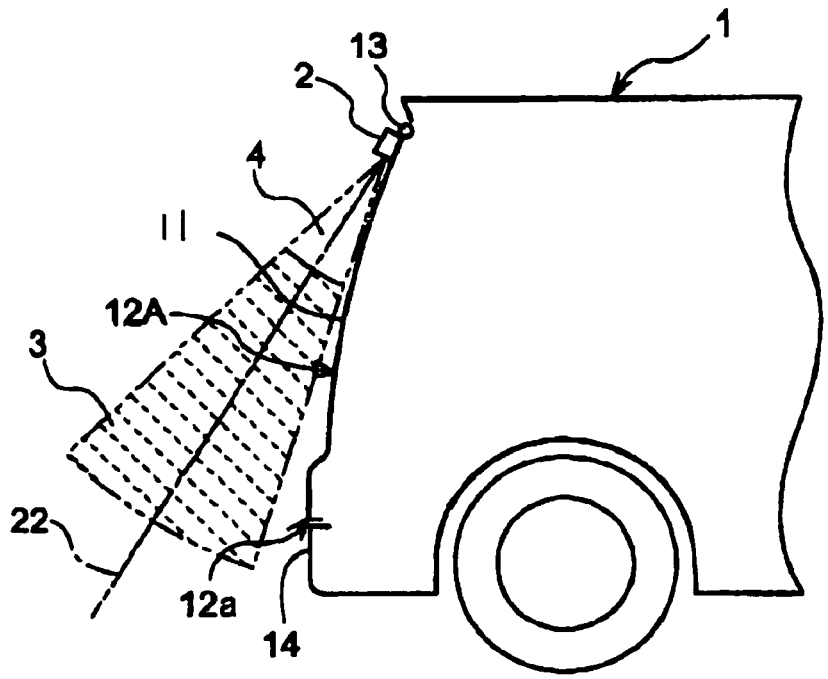
FIG. 5 is a lateral view of a vehicle showing a detectable range of an ultrasonic sensor according to a variation of the first embodiment of the present invention.

A variation of the present invention will be explained as follows. In the first embodiment of the present invention, a position of the ultrasonic sensor 2 and a direction of the central axis 22 in a transmitting direction of ultrasonic wave is set so that the detectable range 3 of the ultrasonic sensor 2 covers the surface 12 of the vehicle body. However, the ultrasonic sensor 2 and the central axis 22 way be arranged so that the detectable range does not cover the surface of the vehicle. As shown in FIG. 5, by increasing angle between the central axis 22 in the direction for transmitting ultrasonic wave and the surface 12A of the rear door 11, the detectable range 3 can be set so that the detectable range 3 does not cover the surface of the vehicle body. In this case, obstacles can be detected from further distance from the vehicle compared to the first embodiment of the present invention.

Figure 6A:
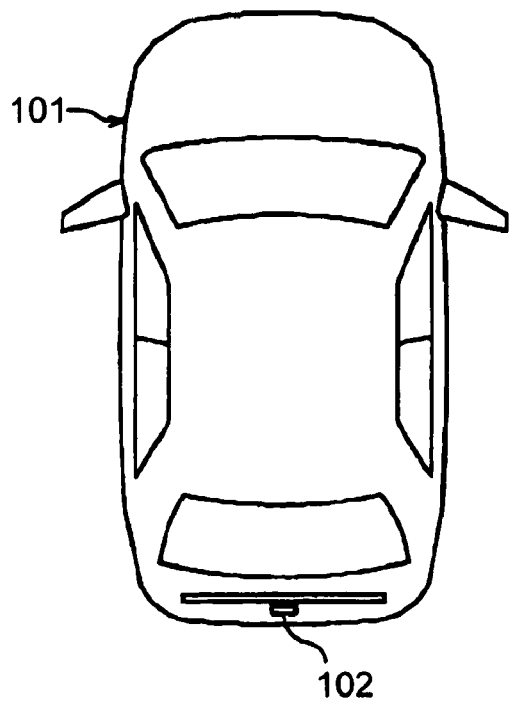
FIGS. 6A-6B are views showing an attached position of an ultrasonic sensor according to a second embodiment of the present invention.
Figure 6B:
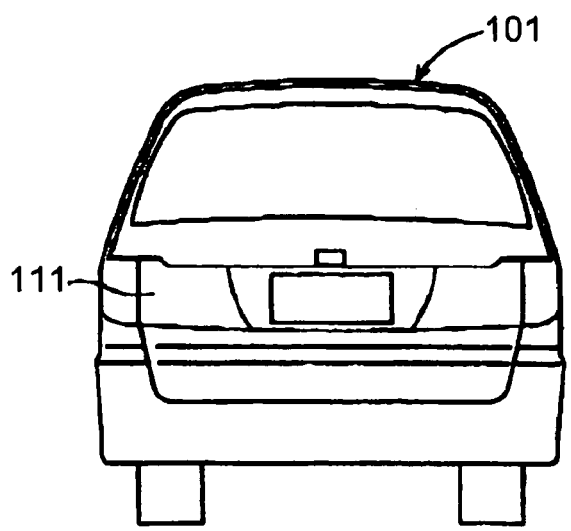
Figure 7:
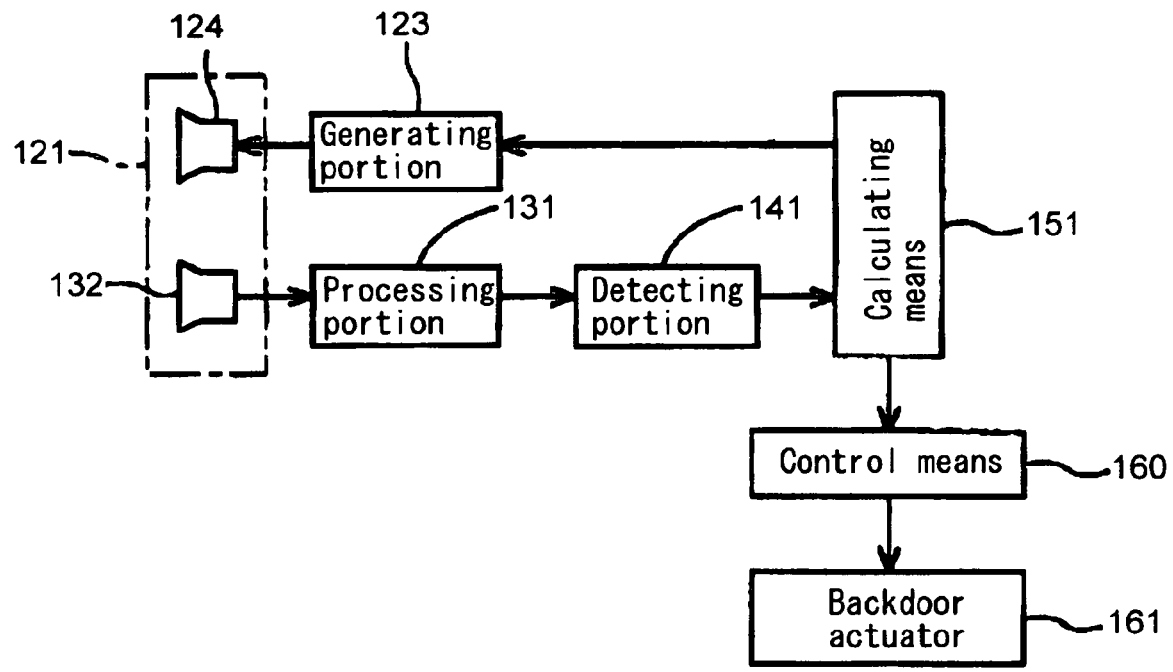
FIG. 7 shows an example of an obstacle detecting system for a vehicle according to the second embodiment of the present invention.

An overview of an obstacle detecting system for a vehicle according to a second embodiment of the present invention will be explained as follows. The application of the obstacle detecting system for the vehicle according to the present invention is not limited, and can be, for example, applied to a hatchback which includes a rear door 111 which opens upward as shown in FIG. 6. As shown in FIG. 7, the obstacle detecting system for the vehicle includes a transmitting means 124 which transmits ultrasonic signal (ultrasonic wave, e.g., pulse signal) outward of a vehicle 111, and a receiving means 132 which receives the ultrasonic signal reflected on a surface of an obstacle 105 which is positioned apart from the vehicle 1. A sensor head 121, which includes the transmitting means 124 and the receiving means 132, is provided on a surface of the rear door 111. The obstacle detecting system for the vehicle further includes a calculating means 51 which specifies the position of the obstacle on the basis of time elapsed from transmitting an ultrasonic signal (wave) by the transmitting means 124 to receiving the ultrasonic signal (wave) by the receiving means 132.

The obstacle detecting system for the vehicle according to the embodiment of the present invention includes a generating portion 123 which generates ultrasonic signals. The generating portion 123 outputs an oscillation signal every input of a timing signal from the calculating means 151 to transmit ultrasonic signals (e.g., pulse signals) from the transmitting means 124. The obstacle detecting system for the vehicle further includes a processing portion 131 and a detecting portion 141. The processing portion 131 processes a reflected signal received at the receiving means 132 by amplifying or filtering, or the like. The detecting portion 141 commutates all of ultrasonic signals (e.g., pulse signals) processed at the processing portion 131 and integrates them to be envelope reflected signals. The envelope reflected signals are outputted to the calculating means 151. The calculating means 151 detects the position of the obstacle 105 on the basis of the envelope reflected signal.

A control means 160 controls a backdoor actuator 161 to stop opening actuation of an opening and closing body when the obstacle 105 specified by the calculating means 151 is positioned within range R1 which is predetermined outside relative to a surface of the rear door 111.

Figure 8:
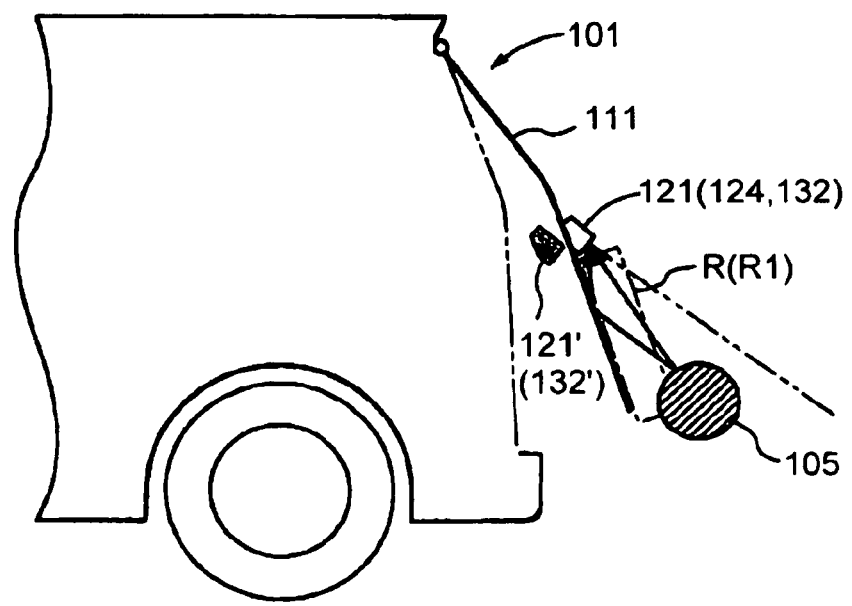
FIG. 8 is an explanatory view showing a rear portion of a vehicle when reflected signals from a common ultrasonic signal are received.
Figure 9:
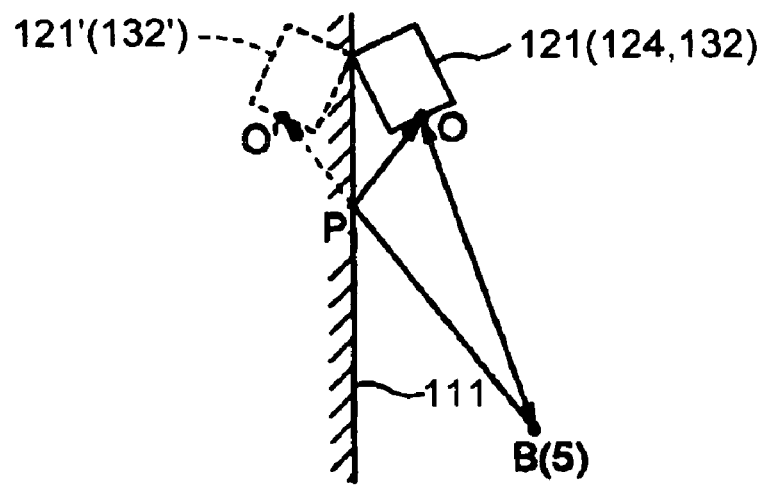
FIG. 9 is an explanatory view showing a path for receiving the reflected signals by a receiving means.

How to specify positions of obstacles will be explained as follows. As shown in FIG. 8, reflected signals received by the receiving means 132 includes a reflected wave received by the receiving means 132 after being transmitted from the transmitting means 124 and reflecting on a surface of the obstacle 105 (i.e., hereinafter referred as a direct reflected signal) and a reflected signal received by the receiving means 132 after reflected on a surface of the vehicle 101 after reflected at a surface of the obstacle 105. Namely, as shown in FIG. 9, there are a reflected signal which is reflected after contacting the obstacle 105 to be directly received by the receiving means 132 through a path BO and a reflected signal which further reflected at point P on a surface of the vehicle 1 after reflected on the obstacle 105 to be received by the receiving means 132 through a path BPO.

With the construction according to the embodiment of the present invention, the position of the obstacle 105 can be specified on the basis of reflected signals received by the receiving means 132 via the foregoing two paths. As shown in FIG. 9, a length of the path BPO through which ultrasonic wave is received by the receiving means 132 is equal to a length of a path BO' through which the ultrasonic wave is received by an imaginary receiving means 132' which is hypothetically arranged at mirror symmetrical position of the receiving means 132 relative to a surface of the vehicle 101

(i.e., a surface of the rear door 111). Accordingly, the position of the obstacle 105 can be obtained on the basis of the direct reflected signal and the reflected signal which is deemed to be received by the imaginary receiving means 132' through the path BO,' (i.e., hereinafter referred as an alternative routing reflected signal) which in fact is the reflected signal received by the receiving means 132 through the path BPO. Namely, the position of the obstacle 105 can be specified on the basis of a length of the path BO obtained on the basis of a time elapsed from transmitting an ultrasonic signal from the transmitting means 124 to receiving the direct reflected signal, a length of the path BO' obtained on the basis of a time elapsed from transmitting an ultrasonic signal from the transmitting means 124 to receiving the alternative routing signal, and a distance OO' between the receiving means 132 and the imaginary receiving means 132'.

Figure 10:
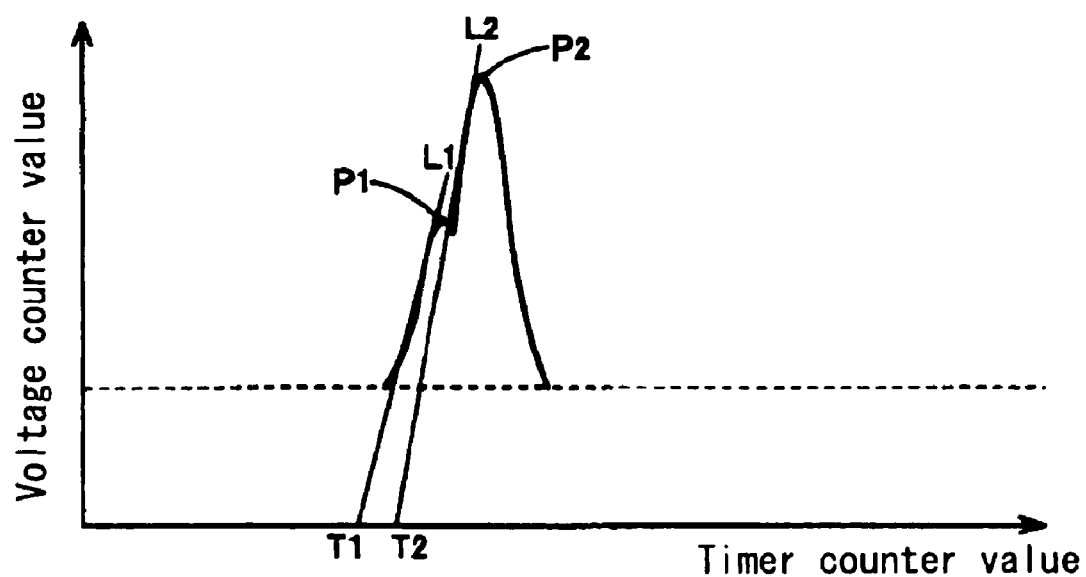
FIG. 10 is a view showing an envelope wave when reflected signals are received at an identical timing.

Processing for specifying the position of obstacles by the calculating means 151 will be explained as follows. When the receiving means 132 receives the direct reflected signal and the alternative reflected signal from a common ultrasonic signal (i.e., an ultrasonic wave outputted at a common timing), each length of a path of the direct reflected signal and a path of the alternative reflected signal from the ultrasonic signal is reflected upon a surface of the obstacle 105 until being received by the receiving means 132 are different. Thus, as shown in FIG. 10, the calculating means 151 obtains an envelope signal having vertex P1 by the direct reflected signal and vertex P2 by the alternative routing reflected signal.

The calculating means 151 specifies the vertices P1, P2 of envelope waveform, and approximation lines L1, L2 are obtained by, for example, a method of least square using voltage counter values within a predetermined range before each vertex. Thereafter, a timer count value (i.e., zero cross time) where each approximation line crosses with zero voltage counter value is obtained. That is, rise estimated values T1, T2 of the envelope wave are specified. Then, the path BO and the path BO' are obtained on the basis of the rise estimated values T1, T2, and the position of the obstacle 105 is specified on the basis of a distance OO' between the receiving means 132 and the imaginary receiving means 132'.

Figure 11:
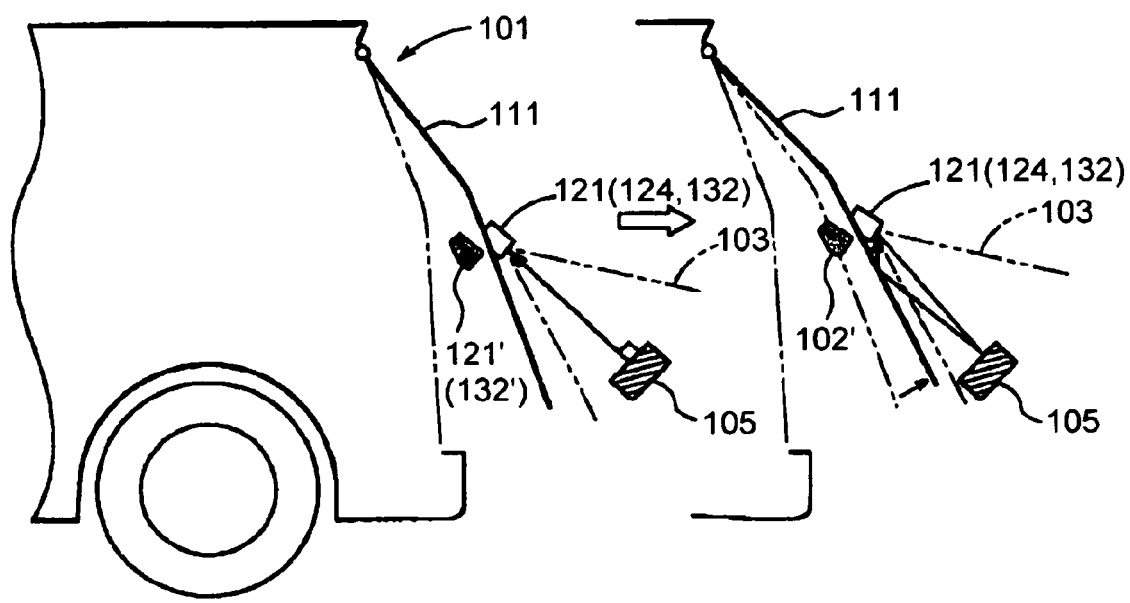
FIG. 11 is an explanatory view showing a rear portion of a vehicle when reflected signals are received at different timings.
Figure 12A:
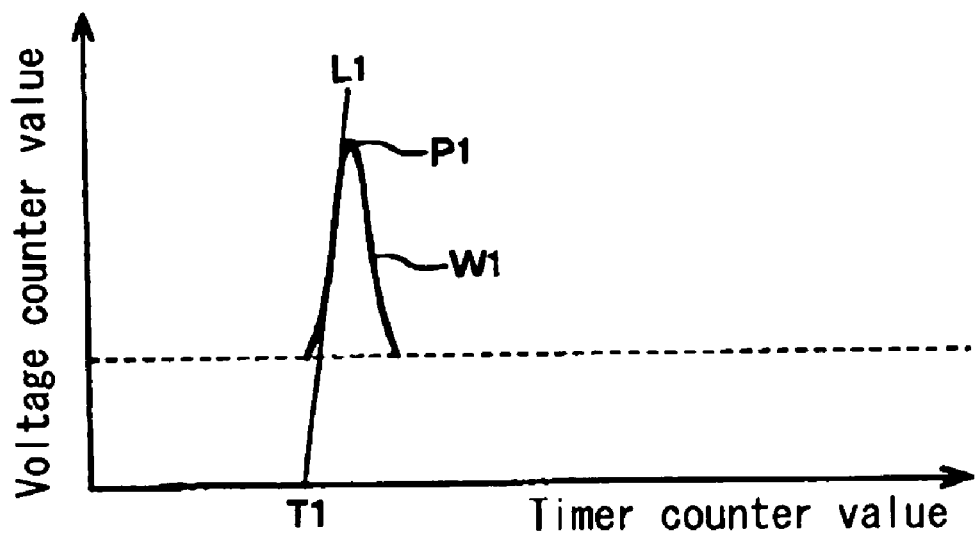
FIGS. 12A-12B are views showing envelope waves when reflected signals are received at different timings.
Figure 12B:
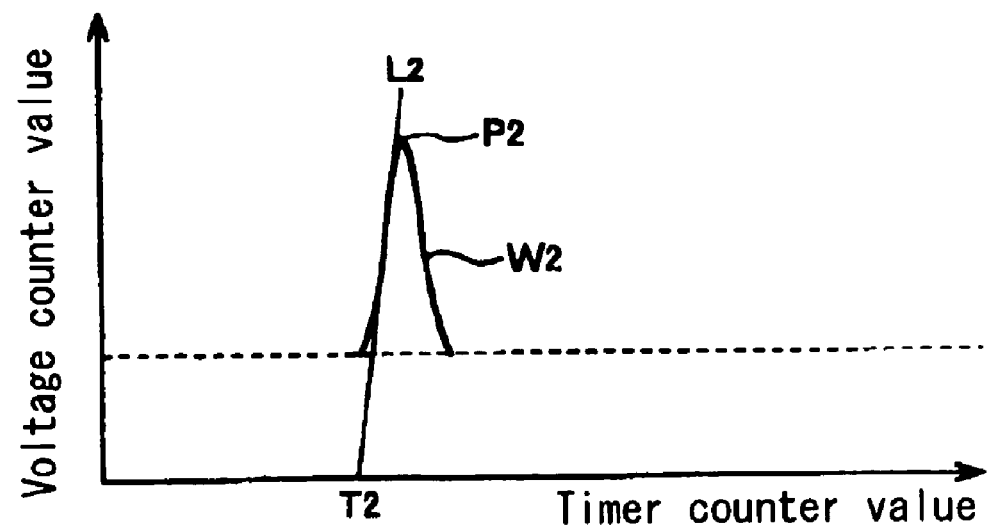

On the other hand, as shown in FIG. 11, because diffused reflection is not caused when a surface of the obstacle 105 is plane, an ultrasonic wave has to be incident upon the obstacle 105 approximately vertically to the obstacle 105 in order to receive the direct reflected wave by the receiving means 132 which is provided in the vicinity of the transmitting means 124. Thus, even when the obstacle 105 is positioned within a detectable range 103 of the sensor head 121, a direct reflected wave and an alternative reflected wave on the basis of a common ultrasonic signal (i.e., an ultrasonic wave outputted at the identical timing) may not be able to received. In this case, the position of the obstacle 105 is detected on the basis of a direct reflected signal and an alternative reflected signal of ultrasonic signals transmitted at different timings. Namely, by saving reflected waves obtained by transmitting ultrasonic signals plural times, for example, in a memory of the calculating means 151, a rise estimated value thereof extracts reflected waves within a predetermined range. Provided that those reflected signals are from the identical obstacles, because a rise estimated value is changed by relative positional changes between the rear door 111 and the obstacle 105 by an opening operation of the rear door 111, the predetermined range is determined on the basis of opening speed of the rear door 111 and a transmitting timing of the ultrasonic signal. The position of the obstacle 105 is specified on the basis of a marked waveform W1 (shown in FIG. 12A) and an extracted waveform W2 (shown in FIG. 12B). As explained above, even when only one of the direct reflected signal and the alternative routing signal of the ultrasonic wave outputted at a common timing can be received, the position of the obstacle 105 can be specified.

A third embodiment of the present invention will be explained as follows. An obstacle detecting system for a vehicle according to the third embodiment of the present invention can be applicable to a hatchback having a rear door 211 (FIG. 15) which opens upward likewise the second embodiment.

Figure 13:
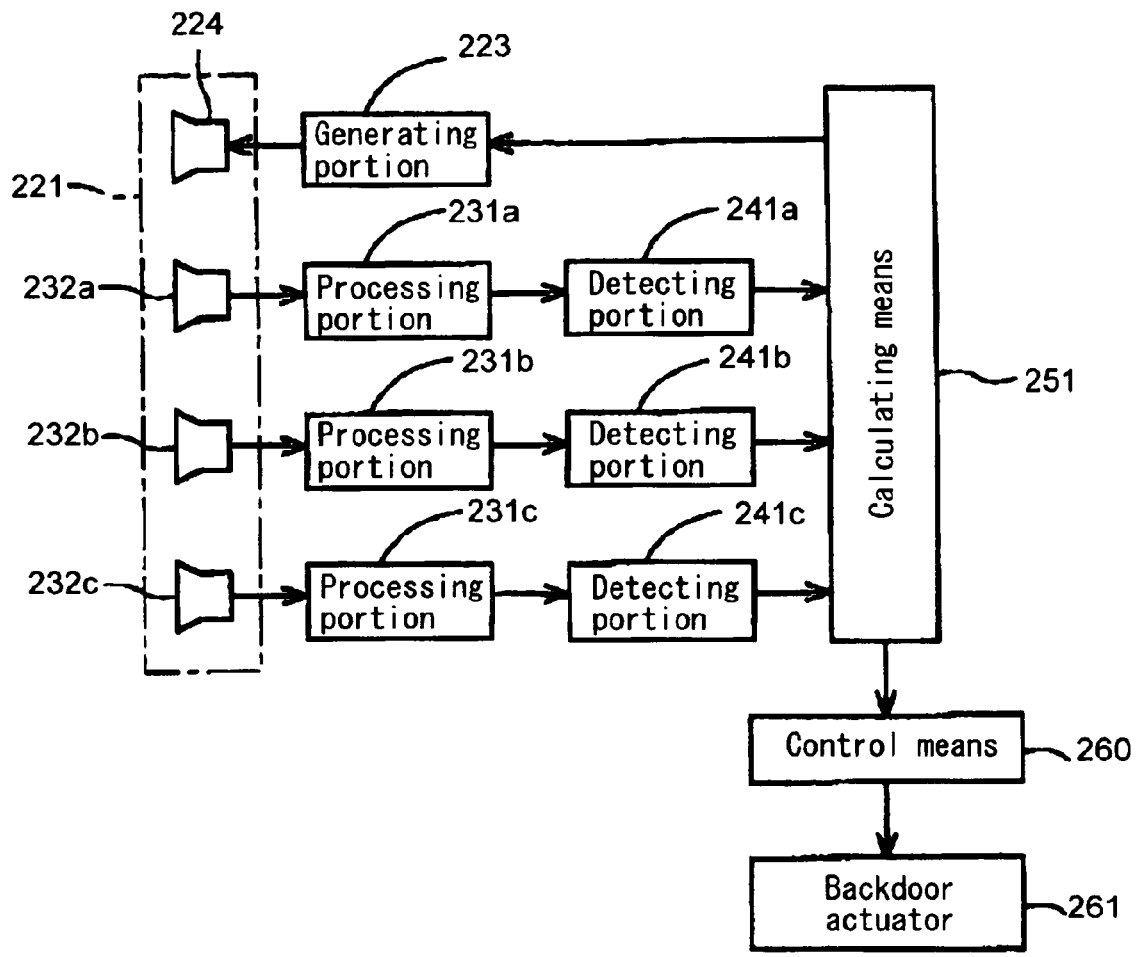
FIG. 13 is a view showing an example of an obstacle detecting system for a vehicle according to a third embodiment of the present invention.
Figure 14:
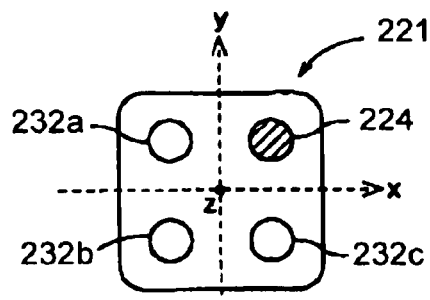
FIG. 14 is a view showing an example of a sensor.

As shown in FIG. 13, the obstacle detecting system for the vehicle includes a transmitting means 224 which transmits an ultrasonic signal in an outward direction of the vehicle 201, and plural receiving means 232a, 232b, 232c which receive the ultrasonic signals reflected on a surface of an obstacle positioned apart from the vehicle 1 at different positions. As shown in FIG. 14, for example, the transmitting means 224, and receiving means 232a, 232b, 232c are provided at the sensor head 221 at positions corresponding to vertices of a square respectively.

The obstacle detecting system for the vehicle further includes a calculating means 251. The calculating means 251 specifies the position of the obstacle 205 on the basis of respective times required from transmitting to receiving ultrasonic signals received by plural receiving means 232a, 232b, 232c. Further, the calculating means 251 determines an actual position of the obstacle 205 at a position which is mirror symmetrical to the specified position relative to a surface of the vehicle 1 when the position of the specified obstacle 205 is determined at an inside of a surface of the obstacle 205.

A control means 260 controls a backdoor actuator 261 to stop an opening operation of the rear door 211 when the obstacle 205 specified by the calculating means 251 is positioned either within a first region R1 (shown in FIG. 15) predetermined at an outside relative to a surface of the rear door 211 or within a second region R2 (shown in FIG. 15) predetermined at an inside relative to a surface of the rear door 211.

Figure 15:
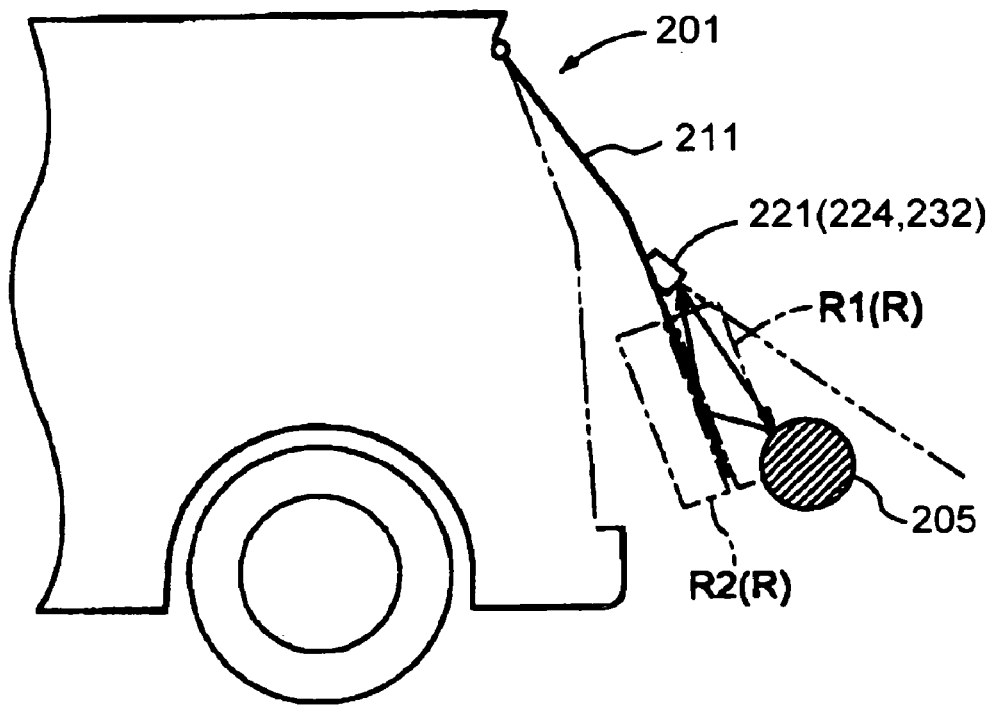
FIG. 15 is an explanatory view showing a path for receiving reflected signals by a receiving means according to the third embodiment of the present invention.
Figure 16:
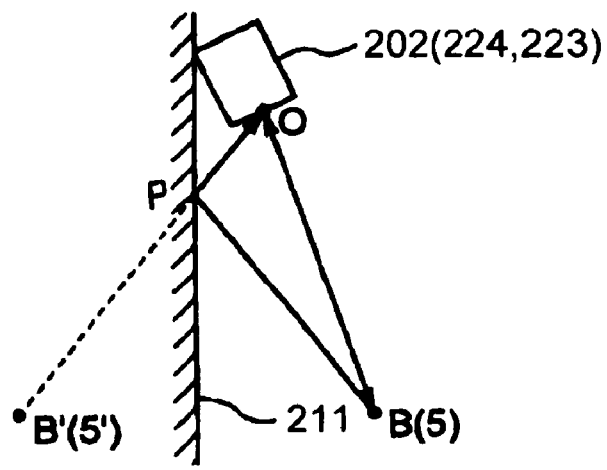
FIG. 16 is a detailed explanatory view showing a path for receiving reflected signals by the receiving means according to the third embodiment of the present invention.

How to specify the position of the obstacle according to the embodiment of the present invention will be explained as flows. With the construction according to the embodiment of the present invention including the plural receiving means 232a, 232b, 232c, a position of the obstacle 205 can be specified on the basis of reflected signals received by each receiving means 232a, 232b, 232c. As shown in FIGS. 15-16, there are a path BO through which the reflected signal which is reflected on the obstacle 205 is received by the ultrasonic wave direct receiving means 232 and a path BPO through which the ultrasonic wave reflected on the obstacle 205 is received by the receiving means 232 after reflected on point P on a surface of a vehicle. When all of the ultrasonic signal transmitted from the transmitting means 224 are received by each of the receiving means 232 through the path BPO, because the reflected waves are returned from inside of the vehicle 1, the obstacle 205 may be specified to be positioned at an inside of the rear door 211.

Namely, as shown in FIG. 16, a length of a path of the ultrasonic wave received by each of the receiving means 232a, 232b, 232c through the path BPO and a length of a path of the ultrasonic wave received by each of the receiving means 232a, 232b, 232c through a path B'O becomes equal when a hypothetical obstacle B(5') is presumed to be mirror symmetrical to the obstacle 205 (i.e., B(5)) relative to a surface of the rear door 211. Accordingly, when the ultrasonic wave is received by the receiving means 232 through the path BPO, the position of the obstacle B(5') is specified at a position which is mirror symmetrical to a position at which the obstacle 205 (i.e., B(5)) actually exists.

Thus, when the calculating means 251 specifies a position of the obstacle B(5') at an inside relative to the surface of the rear door 211, the actual position of the obstacle 205 can be specified by determining the actual position of the obstacle 205 to be at a position which is mirror symmetrical to the .specified position of he obstacle B(5') relative to a position of the rear door 211.

When the position of the obstacle 205 specified by the calculating means 251 is determined within the second region R2, the control means 260 stops opening operation of the rear door 211. Accordingly, even when only reflected waves which is reflected on the rear door 211 can be received by the receiving means 232 after being reflected upon the surface of the obstacle 205, the opening operation of the rear door 211 can be stopped. Paths of ultrasonic signals transmitted from the transmitting means 224 to be reflected on a surface of an obstacle and further to be received by the receiving means 232 after being reflected upon a surface of the vehicle differ depending on a surface configuration of the rear door 211, and specified positions of the obstacle 205 varies accordingly. Thus, it is favorable that the region R is variable.

Figure 17:
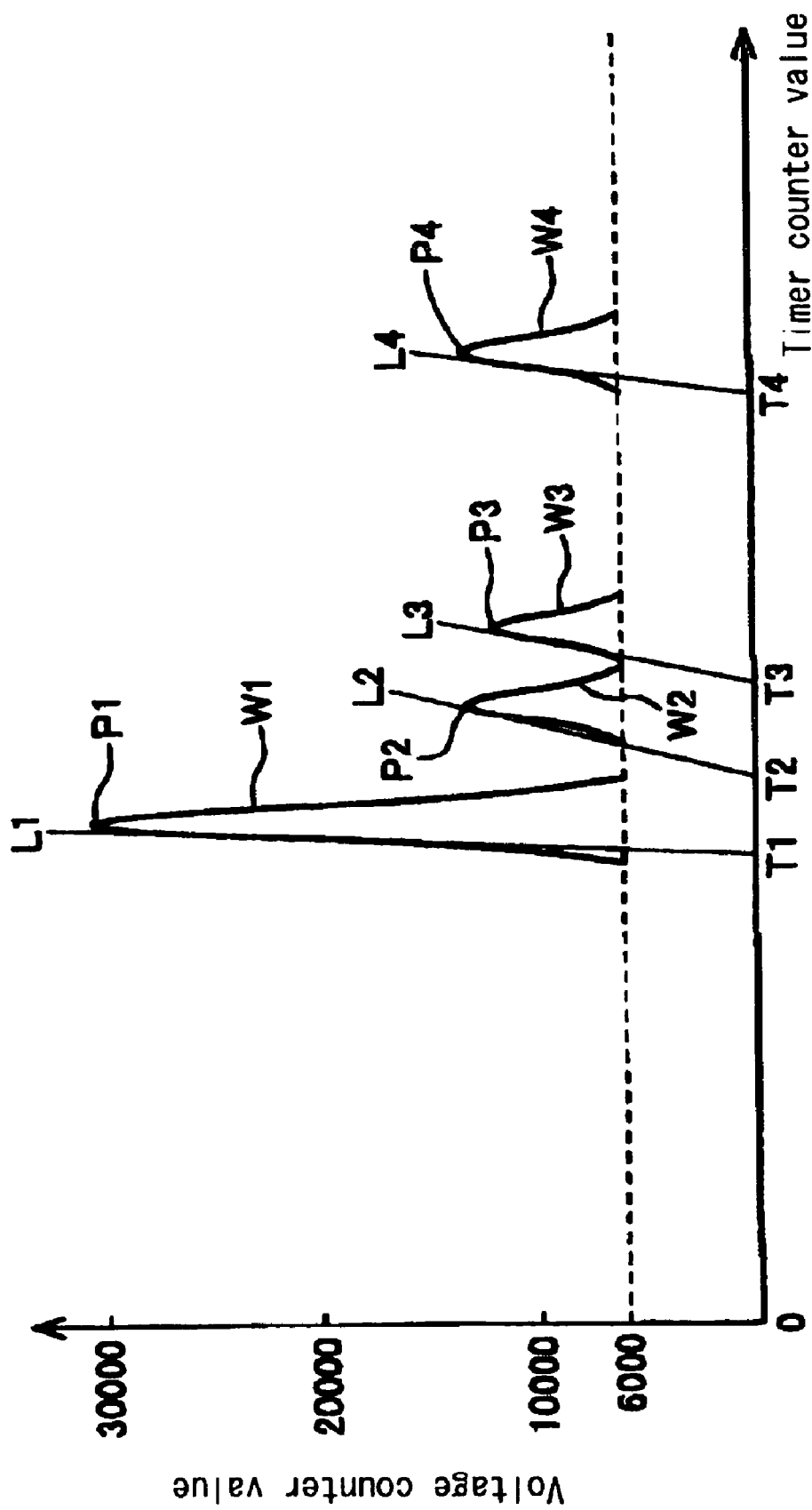
FIG. 17 is a view showing an example of envelope waves of reflected waves.

One example of a processing for specifying the position of obstacles will be explained as follows. A processing when receiving four reflected waves (echoes) at each of the receiving means 232a, 232b, 232c at a predetermined time for measurement will be explained as follows. In this case, four envelope waveforms as shown in FIG. 17 can be obtained for each of the receiving means 232a, 232b, 232c. First, the calculating means 251 specifies a vertex of an envelope waveform for each of the receiving means 232a, 232b, 232c, and obtains approximation lines L1, L2, L3, L4 by, for example, method of least squares using voltage counter value within a predetermined range before each vertex P1, P2, P3, P4. Thereafter, timer count values (zero cross time) T1, T2, T3, T4 at which each of the approximation line L1, L2, L3, L4 crosses with zero voltage count value are obtained. Namely, a rise estimated value of envelope waves is specified. The vertex and rise estimated value are specified for reflected signals W1, W2, W3, W4. The foregoing is processed for each of the receiving means 232a, 232b, 232c. As shown in FIG. 18, the calculating means 251 stores a timer count value of an obtained vertex, a voltage count value of the vertex, and rise estimated values T1-T4 in a candidate table for each of the receiving means 232. 200a represents a candidate table for reflected signals obtained by the receiving means 232a, 200b represents a candidate table for reflected signals obtained by the receiving means 232b, and 200c represents a candidate table for reflected signals obtained by the receiving means 32c. Further, die calculating means 51 selects combinations which are candidate values of the identical reflected wave reflected upon the identical obstacle 5 following the relationship of the rise estimated values in the candidate table, Namely, combinations of candidate value which has a difference equal to or less than a predetermined value a of rise estimated values between the candidate table 200a and the candidate table 200b are extracted. Also, combinations of candidate value which has a difference equal to or less than a predetermined value β of rise estimated values between the candidate table 200b and the candidate table 200c are extracted. Further, combinations of candidate value which has a difference equal to or less than a predetermined value γ of rise estimated values between the candidate table 200c and the candidate table 200a are extracted. Eventually, overall combinations are selected by extracting from each of the combinations. The predetermined values α, β, γ are indicators which show whether the reflected signals received by each of the receiving means 232a, 232b, 232c derive from the identical obstacle 205. The predetermined values α, β, γ are determined empirically on the basis of a distance between corresponding receiving means 232. According to the embodiment of the present invention, the predetermined values α, β, γ are 160 (α, β, γ=160).

Differences of rise estimated values regarding all of the candidate value combinations between the candidate table 200a and the candidate table 200b are obtained, and combinations in which obtained difference is equal to or less than 160 are extracted. In this case, as shown in FIG. 19A, three combinations including candidate value 1-candidate value 1, candidate value 3-candidate value 3, and candidate value 4-candidate value 4 are extracted. Likewise, as shown in FIG. 19B, between the candidate table 200b and the candidate table 200c, four combinations including candidate value 1-candidate value 1, candidate value 2-candidate value 2, candidate value 3-candidate value 3, and candidate value 4-candidate value 4 are extracted. Further, as shown in FIG. 19C, between the candidate table 200c and the candidate table 200a, three combinations including candidate value 1-candidate value 1, candidate value 3-candidate value 3, and candidate value 4-candidate value 4 are extracted. Thereafter, combinations of overall candidate values are selected from the extracted combinations. Namely, combinations in which a difference of rise estimated values is equal to or less than 160 in every cases among all combinations between candidate tables. In other words, for example, referring to candidate value 1 (5587) of the candidate table 200a, as shown in FIG. 19A, in the candidate table 200b, the candidate value 1 (5685) shows a value of the difference of rise estimated values equal to or less than 160 relative to value 1 of the coordinate table 200a. As shown in FIG. 19C, in the candidate table 200c, the candidate value 1 (5744) shows a value of the difference of rise estimated valued equal to or less than 160. Accordingly, referring to the candidate values 1, 1, 1 of each of the candidate table 200a, 200b, 200c, the difference of the rise estimated values between any candidate values 1, 1, 1 of any candidate tables 200 is equal to or less than 160. Accordingly, a combination of candidate value 1-candidate value 1-candidate value 1 of each candidate table 200 is selected as a combination 1. By processing likewise, as shown in FIG. 20, three combinations are selected as eventual candidate values of the obstacle 205.

Figure 21:
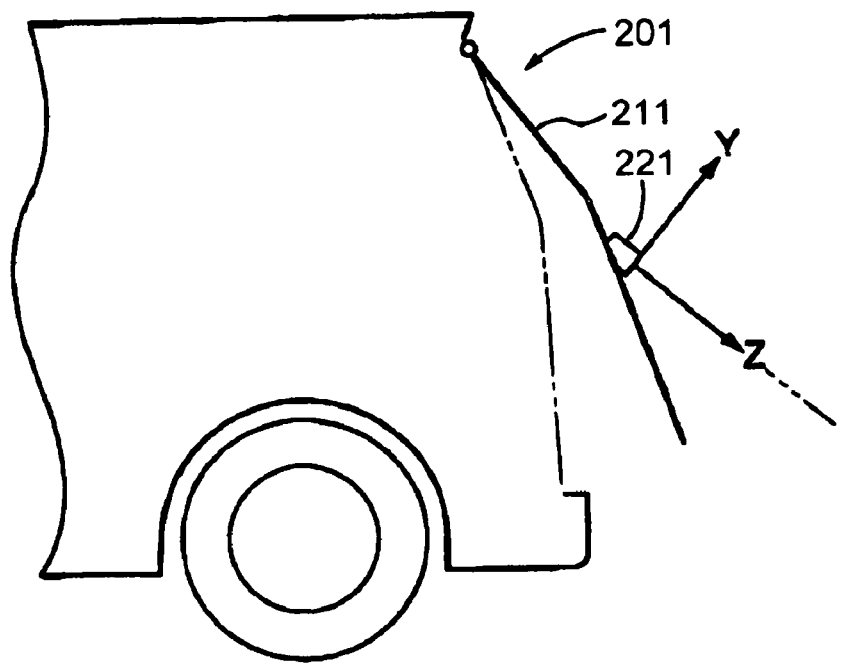
FIG. 21 is a view showing coordinates which specifies a position of an obstacle.
Figure 22A:
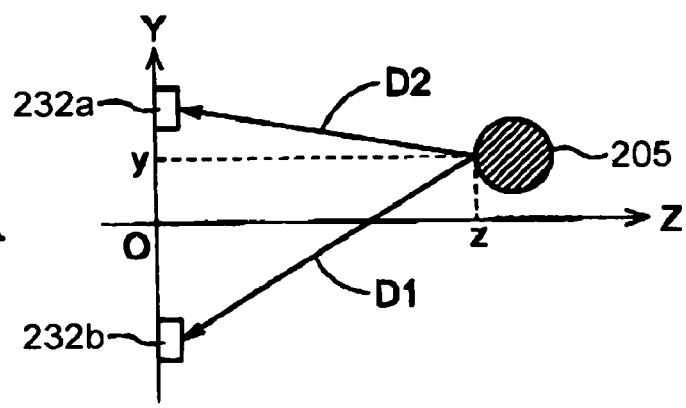
FIGS. 22A-22B are views showing how to specify the position of the obstacle.
Figure 22B:
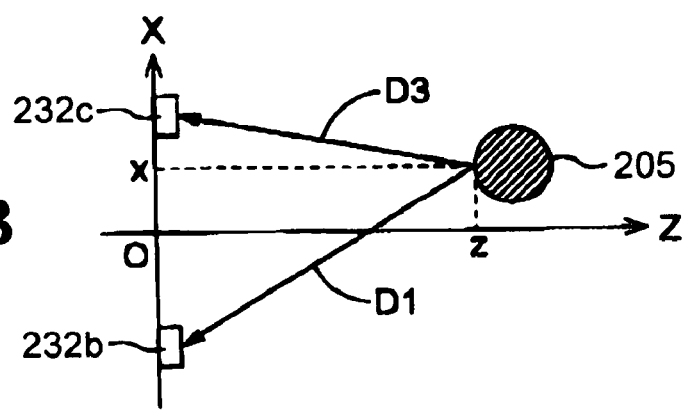

The calculating means specifies the position of obstacles for each combination as coordinates (X,Y, Z) (shown in FIG. 14 and FIG. 21) by triangulation by determining a rise estimated value of each waveform as a receiving time of a reflected wave in accordance with combinations of selected candidate value. For example, when the position of the obstacle 205 is specified by the combination 1 shown in FIG. 20, as shown in FIG. 22A, distance D2 between the receiving means 232a and the obstacle 205 is obtained from the rise estimated value (5587) by the receiving means 232a, and distance D1 between the receiving means 232b and the obstacle 205 is obtained from the rise estimated value (5685) by the receiving means 232b. Distance y in a Y direction and distance z in a Z direction of the obstacle 205 are obtained based on the distance D1 and the distance D2. Further, as shown in FIG. 22B, distance D3 is obtained on the basis of the rise estimated value (5744) by the receiving means 232b. Distance x in a X direction and distance z in a Z direction of the obstacle 205 are obtained on the basis of the distance D1 and the distance D3. By processing the foregoing for each of the combination, as shown in FIG. 23, the positions of obstacles 1-3 are specified.

A fourth embodiment of the present invention will be explained as follows. In the first embodiment of the present invention, the ultrasonic sensor 2 is mounted on the rear door 11 which corresponds to a hinged door which opens upward. The rear door 11 is operated to open and close relative to the vehicle. However, the present invention is also applicable to other hinged vehicle doors such as double doors.

Figures 23, 24:
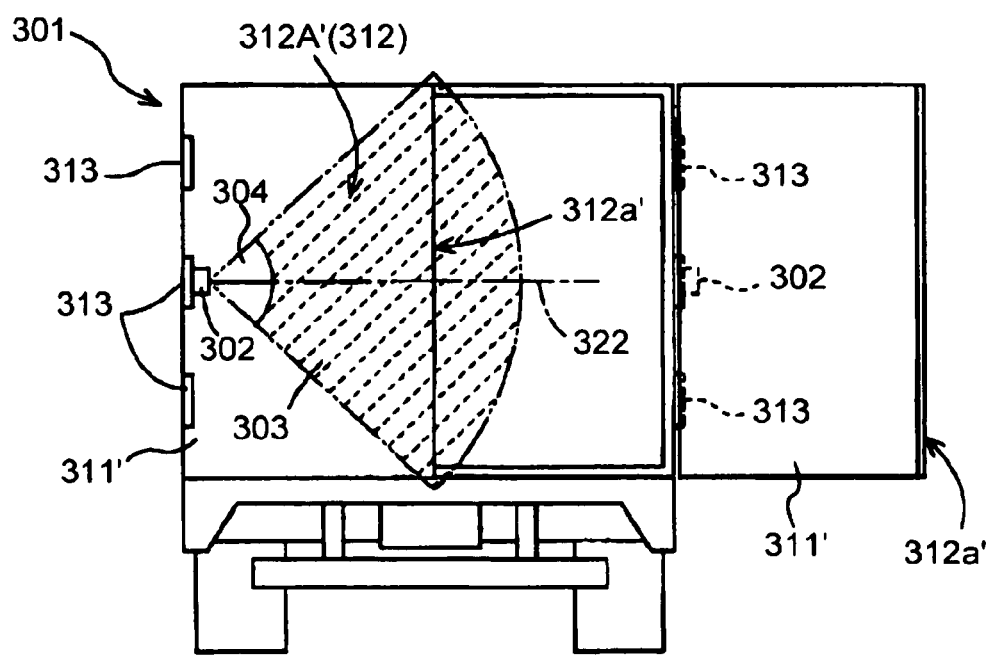
FIG. 23 is a table showing the specified position of the obstacles.
FIG. 24 is a lateral view of a vehicle showing a detectable range of an ultrasonic sensor according to a fourth embodiment of the present invention.

For example, as shown in FIG. 24, an ultrasonic sensor 302 is mounted on rear doors 311' (double doors) of a truck. As shown in FIG. 24, the ultrasonic sensor 302 is positioned in the vicinity of hinges 313 at doors on the right and left. A central axis 322 in a transmitting direction of an ultrasonic wave is set approximately following a surface of the rear door 311', the ultrasonic senor 302 at the left side is set directed to a right direction, the ultrasonic sensor 302 of the right side is set directed to a left direction. A detectable range 303 covers a surface 312A' of the rear door, and a tip end portion 312a'.

Accordingly, when the rear door 311' comes to open, the ultrasonic sensor 302 moves together with the rear door 311', and the central axis 322 comes to constantly and approximately follow the surface 312A' of the rear door of the vehicle. That is, because the detectable range 303 moves together with opening of the rear door 311', an obstacle can be detected readily if the obstacle exists in the opening direction of the rear door 311'. Further, when opening the rear door 311', because the tip end portion 312a' of the surface of the rear door 311', which most likely to contact obstacles, is included within the detectable range 303 of the ultrasonic sensor 302, obstacles can be detected more securely when opening the rear door 311'.

Figure 25A:
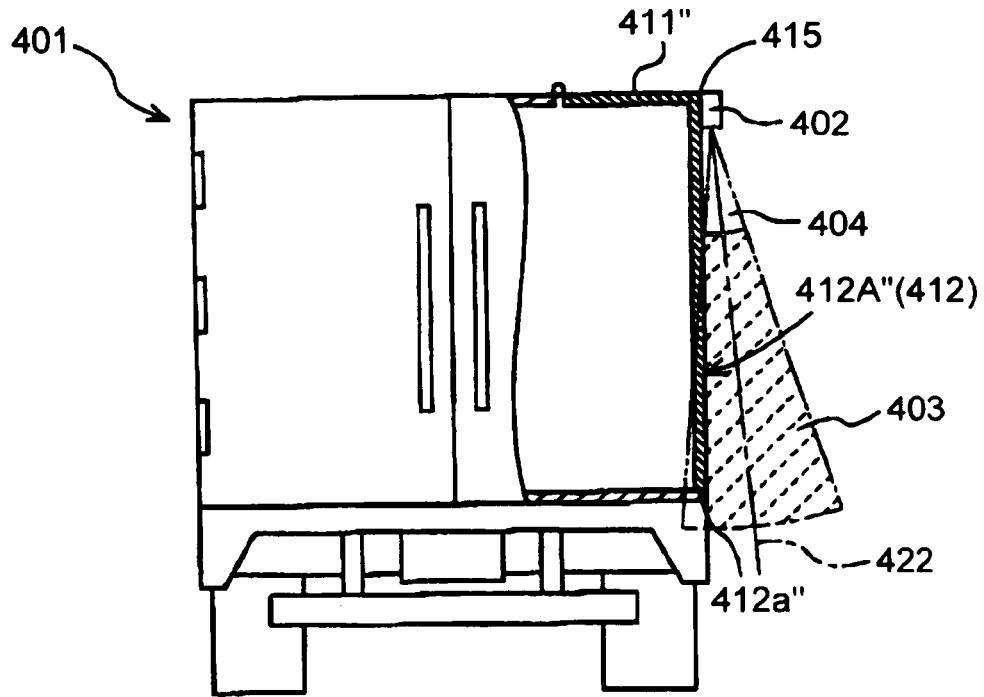
FIG. 25 is a lateral view of a vehicle showing a detectable range of an ultrasonic sensor according to a fifth embodiment of the present invention.
Figure 25B:
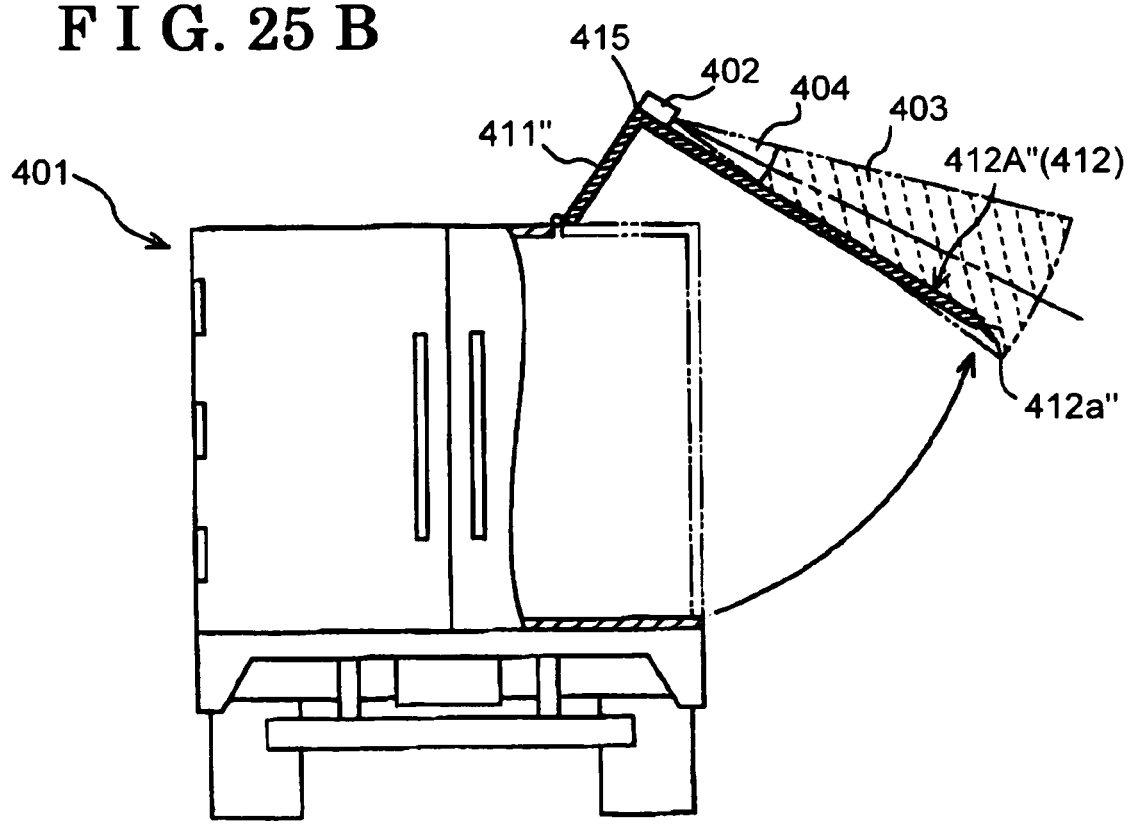

Another variation of the present invention will be explained as follows. In the fourth embodiment of the present invention, the ultrasonic sensor 302 is mounted in the vicinity of the hinges 313 of the rear door 311. However, the ultrasonic sensor 302 may be mounted on other positions. For example, in view of designing, the ultrasonic sensor 302 may be mounted on an emblem on the rear door. In this case, the ultrasonic sensor 302 can be set to detect a tip end of the rear door 311 by slanting a central axis in the transmitting direction of the ultrasonic wave downward, A fifth embodiment of the present invention will be explained as follows. As shown in FIGS. 25A-25B, for example with a gull-wing door 411" of a truck, a tip end portion 412a" of a surface of the vehicle door cannot be covered by a detectable range even if the ultrasonic sensor is positioned in the vicinity of the hinge. In this case, by positioning the ultrasonic sensor 402 at a corner 415 of the gull-wing door, a central axis 422 in a transmitting direction of the ultrasonic sensor 402 is set to approximately follow a surface 412A" of the gull-wing door so that the tip end portion 412a" is covered as detectable range. Accordingly, as shown in FIG. 25B, the detectable range 403 of the ultrasonic sensor 402 moves together when the gull-wing door 411" opens, obstacles can be detected readily even when obstacles are at a lateral position relative to the vehicle. Further, by covering the tip end portion 412a" of the surface of the gull-wing door as the detectable range 403, obstacles positioned in a lateral direction of the vehicle can be more securely detected when opening the gull-wing door 411".

Another variation of the present invention will be explained as follows. In the first embodiment of the present invention, the ultrasonic sensor is mounted on the vehicle door. However, the ultrasonic sensor may be mounted on other parts of the vehicle body other than the vehicle door, Even in that case, because a central axis in a transmitting direction of the ultrasonic wave from the ultrasonic sensor can be set to follow the surface of the vehicle body, the performance of detecting obstacles surrounding the vehicle body can be improved.

According to the embodiment of the present invention, by setting the central axis in the transmitting direction of the ultrasonic sensor to approximately follow the surface of the vehicle, detection performance of obstacles in the vicinity of the vehicle is improved. That is, for example, positioning the ultrasonic sensor on the vehicle body above the bumper, and by slanting the central axis in the transmitting direction of the ultrasonic sensor downward approximately following the surface of the vehicle to include the vicinity of the bumper in the detectable range, the generation of the undetectable range in the vicinity of the bumper can be avoided, and obstacles in the vicinity of the bumper becomes detectable. In this case, "the central axis in the transmitting direction" describes a directional axis which has a maximum strength of the ultrasonic wave sent from the ultrasonic sensor. That is, the approximately center of the transmitting direction of the ultrasonic wave transmitted from the ultrasonic sensor is arranged to follow a surface of the vehicle body.

According to the embodiment of the present invention, by covering the surface of the vehicle within the detectable range of the ultrasonic sensor, ultrasonic wave reflected on the surface of the vehicle can be used for detecting obstacles together with the ultrasonic wave directly sent from the ultrasonic sensor. Because obstacles having a configuration which is difficult to be detected by ultrasonic waves directly sent from the ultrasonic sensor are likely to be detected using ultrasonic wave reflected on the surface of the vehicle, and thus the obstacles can be detected effectively.

According to the embodiment of the present invention, by setting the central axis in the transmitting direction of the ultrasonic sensor approximately following the surface of the hinged vehicle door which is operated to open and close relative to the vehicle, the detectable range of the ultrasonic sensor is moved together with the door even when the hinged vehicle door is opening, and thus obstacles in the opening direction of the vehicle door can be detected.

The tip end portion of the surface of the hinged vehicle door moves the first when the vehicle door starts moving, that is, the tip end portion is most likely to contact obstacles. According to the embodiment of the present invention, by including the tip end portion within the detectable range of the ultrasonic sensor, obstacles can be detected more securely when opening the vehicle door.

According to the embodiment of the present invention, the tip end portion of the surface of the vehicle door moves first when opening the vehicle door, that is, the tip end portion which is likely to contact obstacles the most. By including the tip end portion of the surface of the vehicle door in the detectable range of the ultrasonic sensor, obstacles can be detected securely at an opening operation of the vehicle door. It is preferable to provide the detectable range by arranging the ultrasonic sensor at a position where the tip end portion of the surface of the vehicle door can be in sight from the ultrasonic sensor. However, in general, an external surface of the vehicle door includes various uneven configurations. With the construction according to the embodiment of the present invention, even when the tip end portion of the vehicle door is shaded by other portions of the vehicle door, the tip end portion of the vehicle door is arranged to be within a detectable range. Generally, when an ultrasonic wave passes by in the vicinity of a surface of an object, ultrasonic signals are diffracted to some degrees along the configuration of the surface. Accordingly, with the construction according to the embodiment of the present invention, obstacles in the vicinity of the tip end portion can be detected if an external surface of the vehicle door has a configuration along which an ultrasonic wave can be diffracted even when the tip end portion cannot be in sight from the ultrasonic sensor. Further, by arranging the tip end portion of the vehicle door to be within the detectable range, although a vehicle door generally has a configuration being convex outward, the outermost portion of the door surface from the ultrasonic sensor can be securely positioned within the detectable range. Thus, the obstacle which is in the vicinity of the vehicle door can be detected with high precision.

According to the embodiment of the present invention, a predetermined angle (elevation angle) is determined between the central axis in a transmitting direction of the ultrasonic sensor and a surface f a vehicle door on which the ultrasonic sensor is attached. By positioning the ultrasonic sensor on the surface of the vehicle door so that the central axis in the transmitting direction has a predetermined elevation angle relative to the surface of the vehicle door, measurable range of the ultrasonic sensor can be set adjacent to the vehicle surface. By positioning the ultrasonic sensor with the predetermined elevation angle, undetectable range in the vicinity of the vehicle surface which is inevitable with the known transmitter which transmits ultrasonic waves normal to the surface can be eliminated, and the detectable range of obstacles can be expanded. Further, by adjusting an elevation angle and including a surface of a vehicle within the measurable range of the ultrasonic sensor, a part of ultrasonic waves sent from the ultrasonic sensor which radially extends is incident on a surface of the vehicle with an acute angle to reflect to a side in a transmitting direction (i.e., a farther direction from the ultrasonic sensor) to generate an alternative routing ultrasonic wave. As a result, alternative routing reflected wave (an alternative routing echo) which is generated when the alternative routing ultrasonic wave contacts obstacles and a direct routing reflected wave (direct routing echo) which is generated when the ultrasonic wave sent from the ultrasonic sensor directly contacts the obstacles are combined to reflect back to the ultrasonic sensor as an output, and thus an outputted reflected wave is increased and detection precision can be improved.

According to the embodiment of the present invention, the position of an object is specified on the basis of a direct reflected signal, which is an ultrasonic signal received by the receiving means after being reflected on a surface of the object, and an alternative reflected signal which is an ultrasonic signal received by the receiving means after transmitted from the transmitting means and reflected on a surface of the object and a surface of the vehicle to be deemed as being transmitted from the transmitting means and being received by the imaginary receiving means after being reflected on a surface of the object. Thus, even when there is just one receiving means, the position of the object can be specified as if there are plural receiving means. Accordingly, the position of the object can be specified with a simple construction because plural receiving means are not required.

According to the embodiment of the present invention, the control means stops opening operation of the opening and closing body when the position of the object specified by the calculating means is within a predetermined region predetermined at an outside relative to a surface of the opening and closing body (vehicle door). Thus, even when an object (obstacle) exists surrounding the opening and closing body at outside thereof, the opening and closing body can be prevented to collide with the object.

Depending on states of a surface of an object, a direct reflected signal and an alternative reflected signal based on a common ultrasonic wave may not be able to be received. However, because an ultrasonic wave is transmitted as a pulse, with the construction according to the embodiment of the present invention, the position of the object can be specified by approximation by two ultrasonic signals based on ultrasonic signal transmitted at different timings even when only one of the direct reflected signal and the alternative reflected signal can be received, by calculating the first received ultrasonic signal as the direct reflected signal and the second received ultrasonic signal as the alternative reflected signal when received timings of two ultrasonic signals received by the receiving means are within a predetermined time length.

With the construction of the embodiment of the present invention, which includes the plural receiving means, the position of an object can be specified on the basis of reflected waves received by each receiving means. For example, when all of the ultrasonic signals transmitted from the transmitting means are reflected on a surface of an object and are further reflected on a surface of the vehicle to be received by the receiving means, because the reflected waves are returned from the vehicle, the obstacle may be specified to be positioned at an inside relative to the vehicle door. With the construction according to the embodiment of the present invention, when it is determined that the specified object is positioned at an inside relative to a surface of the vehicle, the calculating means determines that an actual position of the object is mirror symmetrical to the specified position relative to the surface of the vehicle. As a result, the position of the object can be specified not only by directly receiving the reflected signal reflected on the surface of the object by the receiving means, but also by receiving the reflected signal reflected on a surface of the vehicle by the receiving means.

With the construction according to the embodiment of the present invention, the control means stops an opening operation of the opening and closing body when an object specified by the calculating means is positioned within a predetermined region predetermined at an inside relative to a surface of the opening and closing body (vehicle door). Accordingly, even when the receiving means cannot directly receive the reflected wave reflected on a surface of the object, an opening operation of the opening and closing body can be stopped by receiving the reflected wave at an a surface of the opening and closing body.

Depending on a configuration of an opening and closing body, paths of ultrasonic waves when an ultrasonic signal is transmitted from the transmitting means is reflected on a surface of an object, further reflected on a surface of the vehicle, and received by the receiving means are varied, and a specified position of an object is varied. However, with the construction according to the embodiment of the present invention, because the predetermined region can be changed in accordance with a surface configuration of an opening and closing body, an obstacle detection system for a vehicle according to the embodiment of the present invention can be applied to various vehicles having a variety of opening and closing body.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An obstacle detecting system for a vehicle, comprising:
an ultrasonic sensor configured to be provided at a surface of a vehicle door, which is fixed to a vehicle body by a hinge and is operated to open and close relative to the vehicle body; wherein
a central axis in a transmitting direction of an ultrasonic wave from the ultrasonic sensor is arranged to have an angle equal to or greater than zero degrees and less than 90 degrees relative to the surface of the vehicle door,
wherein the ultrasonic sensor comprises:
a transmitting means provided being deviated outward of the vehicle from the surface of the vehicle door for transmitting ultrasonic signals; and,
a receiving means provided being deviated outward of the vehicle from the surface of the vehicle for receiving the ultrasonic signals reflected on a surface of an object which is positioned apart from the vehicle; the obstacle detecting system for the vehicle further comprising:
a calculating means for obtaining a position of the object on the basis of a direct reflected signal, which is a first ultrasonic signal transmitted from the transmitting means and received by the receiving means after reflected on the surface of the object and an alternative routing reflected signal which is a second ultrasonic signal, transmitted from the transmitting means to be received by the receiving means after being reflected on the surface of the object and on a surface of the vehicle, deemed as being transmitted from the transmitting means and received by an imaginary receiving means hypothetically determined at a position being mirror symmetrical to the receiving means relative to the surface of the vehicle after being reflected on the surface of the object.

2. The obstacle detecting system for the vehicle according to claim 1, wherein the surface of the vehicle is a surface of an opening and closing body which is operated to open and close relative to the vehicle; and the obstacle detecting system for the vehicle further comprising:
a control means for stopping an opening operation of the opening and closing body when the position of the object specified by the calculating means is within a predetermined region predetermined at an outside location relative to the surface of the opening and closing body.

3. The obstacle detecting system for the vehicle according to claim 2, wherein the transmitting means transmits the ultrasonic signals by a pulse; and wherein when two ultrasonic signals are received by the receiving means at different timings within a predetermined time range, the ultrasonic signal received first is determined as the direct reflected signal and the ultrasonic signal received second is determined as the alternative routing reflected signal.

4. An obstacle detecting system for a vehicle, comprising:
an ultrasonic sensor configured to be provided at a surface of a vehicle door, which is fixed to a vehicle body by a hinge and is operated to open and close relative to the vehicle body; wherein
a central axis in a transmitting direction of an ultrasonic wave from the ultrasonic sensor is arranged to have an angle equal to or greater than zero degrees and less than 90 degrees relative to the surface of the vehicle door,
wherein the ultrasonic sensor comprises:
a transmitting means transmitting ultrasonic signals outward of the vehicle; and
a plurality of receiving means receiving the ultrasonic signals reflected on a surface of an object positioned apart from the vehicle; the obstacle detecting system for the vehicle further comprising:
a calculating means specifying a position of the object on the basis of times elapsed from transmitting to receiving the ultrasonic signals to be received by the plurality of receiving means, and
determining an actual position of the object at a position being mirror symmetrical to the specified position of the object relative to the surface of the vehicle door when the specified position is determined to be at an inside location relative to the surface of the vehicle door.

5. The obstacle detecting system for the vehicle according to claim 4, wherein the surface of the vehicle door is a surface of an opening and closing body operated to open and close relative to the vehicle; and the obstacle detecting system for the vehicle further comprising:
a control means stopping an opening operation of the opening and closing body when the position of the object specified by the calculating means is within a predetermined region predetermined at an inside location relative to the surface of the opening and closing body.

6. The obstacle detecting system for the vehicle according to claim 5, wherein the predetermined region is variable.

7. An obstacle detecting system for a vehicle, comprising:
an ultrasonic sensor configured to be provided at a surface of a vehicle door, which is fixed to a vehicle body by a hinge and is operated to open and close relative to the vehicle body; wherein
a central axis in a transmitting direction of an ultrasonic wave from the ultrasonic sensor is arranged to have an angle eciual to or greater than zero degrees and less than 90 degrees relative to the surface of the vehicle door,
wherein the ultrasonic sensor comprises:
a transmitting means provided being deviated outward of the vehicle from the surface of the vehicle door for transmitting ultrasonic signals outward of the vehicle; and
a receiving means provided being deviated outward of the vehicle from the surface of the vehicle door for receiving the ultrasonic signals reflected on a surface of an object which is positioned apart from the vehicle; the obstacle detecting system for the vehicle further comprising:
a calculating means for obtaining a position of the object on the basis of a direct reflected signal, which is a first ultrasonic signal transmitted from the transmitting means and received by the receiving means after reflected on the surface of the object and an alternative routing reflected signal which is a second ultrasonic signal, transmitted from the transmitting means to be received by the receiving means after being reflected on the surface of the object and on a surface of the vehicle door, deemed as being transmitted from the transmitting means and received by an imaginary receiving means hypothetically determined at a position being mirror symmetrical to the receiving means relative to the surface of the vehicle after being reflected on the surface of the object.

8. The obstacle detecting system for the vehicle according to claim 7, wherein the surface of the vehicle door is a surface of an opening and closing body which is operated to open and close relative to the vehicle; and the obstacle detecting system for the vehicle further comprising:

a control means for stopping an opening operation of the opening and closing body when the position of the object specified by the calculating means is within a predetermined region predetermined at an outside location relative to the surface of the opening and closing body.

9. The obstacle detecting system for the vehicle according to claim 8, wherein the transmitting means transmits the ultrasonic signals by a pulse; and wherein when two ultrasonic signals are received by the receiving means at different timings within a predetermined time range, the ultrasonic signal received first is determined as the direct reflected signal and the ultrasonic signal received second is determined as the alternative routing reflected signal.

10. An obstacle detecting system for a vehicle, comprising:
   an ultrasonic sensor configured to be provided at a surface of a vehicle door, which is fixed to a vehicle body by a hinge and is operated to open and close relative to the vehicle body; wherein
   a central axis in a transmitting direction of an ultrasonic wave from the ultrasonic sensor is arranged to have an angle equal to or greater than zero degrees and less than 90 degrees relative to the surface of the vehicle door,
   wherein the ultrasonic sensor comprises:
      a transmitting means transmitting ultrasonic signals outward of the vehicle; and
      a plurality of receiving means receiving the ultrasonic signals reflected on a surface of an object positioned apart from the vehicle; the obstacle detecting system for the vehicle further comprising:
   a calculating means specifying a position of the object on the basis of times elapsed from transmitting to receiving the ultrasonic signals to be received by the plurality of receiving means, and
   determining an actual position of the object at a position being mirror symmetrical to the specified position of the object relative to the surface of the vehicle door when the specified position is determined to be at an inside location relative to the surface of the vehicle door.

11. The obstacle detecting system for the vehicle according to claim 10, wherein the surface of the vehicle door is a surface of an opening and closing body operated to open and close relative to the vehicle; and the obstacle detecting system for the vehicle further comprising:
   a control means stopping an opening operation of the opening and closing body when the position of the object specified by the calculating means is within a predetermined region predetermined at an inside location relative to the surface of the opening and closing body.

12. The obstacle detecting system for the vehicle according to claim 11, wherein the predetermined region is variable.

\* \* \* \* \*